Sept. 30, 1952 R. R. THALNER 2,612,622

SCANNING SYSTEM FOR CATHODE-RAY TUBES

Filed Dec. 14, 1950

INVENTOR
ROBERT R. THALNER
BY John A. Harvey
ATTORNEY

Patented Sept. 30, 1952

2,612,622

UNITED STATES PATENT OFFICE 2,612,622

SCANNING SYSTEM FOR CATHODE-RAY TUBES

Robert R. Thalner, Buffalo, N. Y., assignor to Sylvania Electric Products Inc., a corporation of Massachusetts Application December 14, 1950, Serial No. 200,712

5 Claims. (Cl. 315—27)

Figures 1, 2:
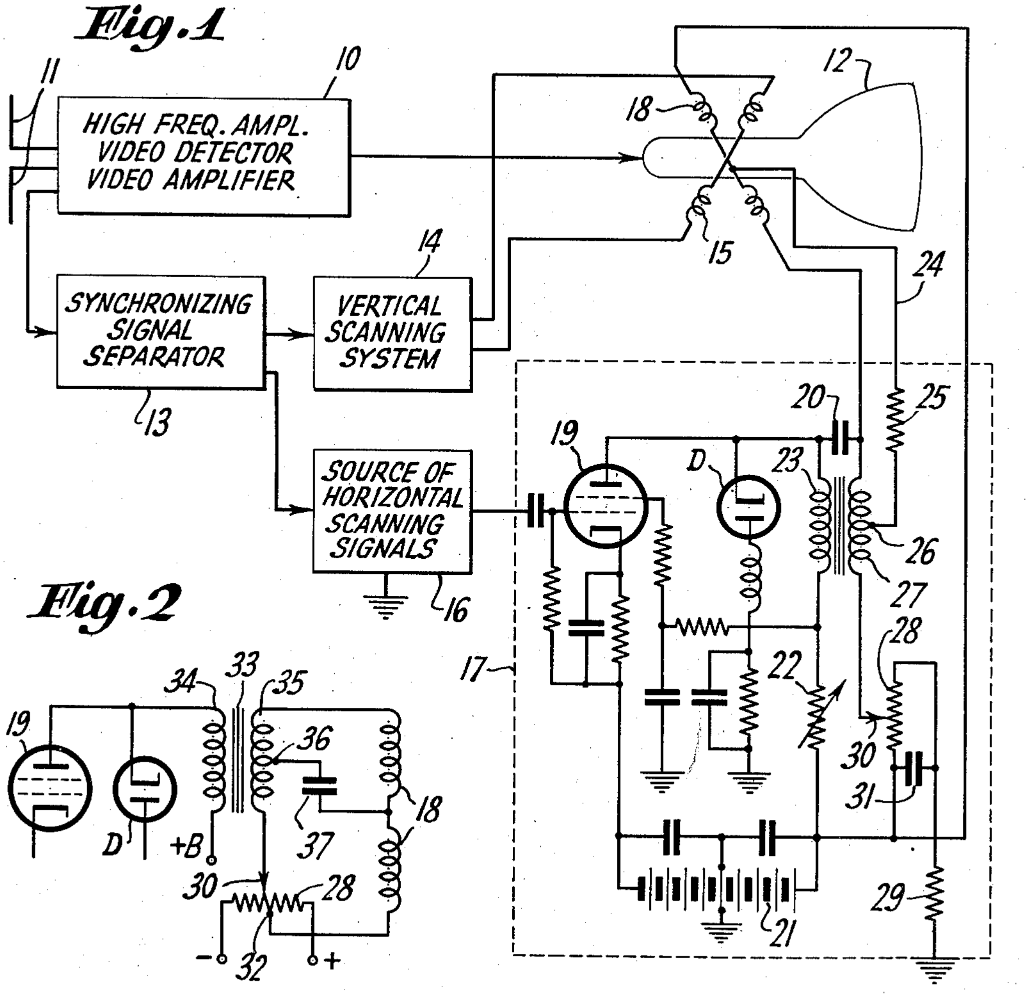

The present invention relates to scanning systems for cathode-ray tubes and, particularly, to magnetic scanning systems such as employed in the horizontal scanning system of a television receiver.

The horizontal scanning system of a conventional television receiver ordinarily supplies currents of saw-tooth waveform to a horizontal deflection winding of a scanning yoke positioned about the neck of a cathode-ray tube type of image-reproducing device by which to effect horizontal deflection of the electron beam of the tube. The horizontal scanning winding is ordinarily comprised of two sections, and the electrical connections of these sections and their mechanical positioning causes one of the winding sections to have a larger value of inherent capacitance at its terminals than does the other section. The frequency of the saw-tooth scanning currents is sufficiently high that this unbalanced capacitance tends to cause an undesirable form of uncontrolled or free oscillation during the scanning retrace interval which may persist for a short time at the beginning of the trace interval and thereby undesirably affect the scanning action of the system.

It has heretofore been proposed that the effect of the unbalanced capacitances across the horizontal scanning winding sections of the scanning yoke be reduced by connecting the two sections in parallel, but this requires that the windings be formed of an appreciably larger number of turns of smaller sized wire as compared to a scanning winding in which the two sections are series connected. There is also the disadvantage that the large voltage, of the order of several thousand volts, generated across the scanning winding during the retrace interval appears in full magnitude across each winding section when the sections are connected in parallel so that the problem of providing adequate insulation for the winding sections becomes more severe.

It has also been proposed that the unequal capacitances across the series connected horizontal deflection winding sections be equalized by connecting a physical capacitor of appropriate value across the winding having the lower value of inherent capacitance. This, of course, increases somewhat the cost of the deflection system.

It is an object of the present invention to provide a new and improved magnetic scanning system in which the undesirable effect of any unbalanced inherent capacitances of the horizontal scanning winding sections is substantially reduced.

It is a further object of the invention to provide a novel magnetic scanning system of simple and inexpensive construction and one in which inherent unequal capacitances across the horizontal scanning winding sections have little or no effect upon the operation of the system.

For a better understanding of the present invention, together with other and further objects thereof, reference is had to the following description taken in connection with the accompanying drawing, and its scope will be pointed out in the appended claims.

Referring now to the drawings, Fig. 1 is a circuit diagram, partly schematic, representing a complete television receiver embodying the present invention in a particular form; Fig. 2 is a circuit diagram representing a portion of a scanning system embodying the invention in a modified form; and Fig. 3 also is a portion of a scanning system embodying the invention in an additionally modified form.

Referring now more particularly to Fig. 1, the television receiver includes a unit 10 having an input circuit coupled to an antenna 11 and an output circuit coupled to the intensity-control electrodes of a cathode-ray tube type of image reproducer 12. The unit 10 is conventional and includes a high frequency amplifier, a video detector, and a video amplifier. The picture signal developed in the output circuit of the video detector of unit 10 is applied to a synchronizing-signal separator 13 where the synchronizing signal components of the picture signal are separated from each other and from the video components thereof, the vertical synchronizing components being applied to control the synchronized operation of a vertical scanning system 14. The output circuit of the latter unit is coupled to a vertical deflecting winding 15 of a scanning yoke positioned in a conventional manner about the neck of the image reproducer 12. The horizontal synchronizing signal components, separated from the television signal by the unit 13, are applied to a source of horizontal scanning signals 16 to control the synchronized operation thereof. The unit 16 is conventional, and the output circuit of this unit is coupled to a scanning amplifier 17, the detailed arrangement and operation of which will be described hereinafter. The output circuit of unit 16 is coupled to a horizontal scanning winding 18 of the deflection yoke.

With the exception of the scanning amplifier 17, the construction and operation of the television receiver thus far described is conventional in that a television signal received by the antenna 11 is applied to the unit 10 where it is amplified, detected, and again amplified after detection before being used to control the intensity of the cathode-ray beam of the image-reproducing tube 12. The vertical and horizontal synchronizing components of the received signal are separated by the separator 13 and are applied to the respective vertical scanning system 14 and source of horizontal scanning signals 16 to control the synchronized operation thereof. The scanning signals applied from the output circuit of the unit 14 to the vertical deflection winding 15 and the scanning signal applied to the horizontal scanning winding 18 through the amplifier 17 from the source 16 cause the cathode-ray beam of the tube 12 to trace a raster of horizontal lines to reproduce the television image.

Referring now more particularly to the portion of the receiver embodying the present invention, the unit 17 includes an amplifier tube 19 having input electrodes coupled to the output circuit of the unit 16 and having output electrodes coupled through a condenser 20 to the horizontal scanning winding 18. The amplifier tube 19 is energized from a source of uni-directional current 21 through an adjustable horizontal size-control resistor 22 and an iron-core choke coil 23. A conventional diode type of damper tube D is coupled across the output circuit of the amplifier 19 for well known reasons.

The horizontal scanning winding 18 is center-tapped, and undesirably has unequal inherent distributed capacitances across the two halves thereof. To reduce the undesirable effect of these unequal distributed capacitances on the scanning action effected by the scanning system, the center tap of the scanning winding 18 is coupled through a conductor 24 and a resistor 25 to the center tap 26 of a choke coil 27 which is inductively coupled to the choke coil 23. The choke coils 23 and 27 have the same number of turns of wire and are tightly coupled magnetically. Centering current for the deflecting winding 18 is provided by a voltage divider 28 the resistive element of which is coupled through a resistor 29 across a portion of the uni-directional current source 21 and the movable contact 30 of which is connected to one end of the choke coil 27. A by-pass condenser 31 is connected across the resistive element of the voltage divider 28 to by-pass around the latter any alternating current components of scan frequency.

Considering now the operation of the scanning system just described, the source 16 and amplifier 19 comprise a source of scanning signals for effecting energization of the scanning winding 18 with currents of linear saw-tooth scanning waveform. This scanning system is of the so-called "high-impedance" type in which the diode device D is continuously conductive and current is supplied to the scanning winding 18 substantially only during the latter half of the relatively long "trace" interval of the saw-tooth scanning signal. During the initial portion of the "trace" interval, the energy stored in the scanning winding 18 discharges at a constantly decreasing rate through the diode device D. The latter also serves to damp out any undesired transient oscillations which may occur at the end of the relatively short "retrace" interval of the saw-tooth scanning signal.

Where the scanning winding 18 has two sections or halves connected in series with aiding magnetic fields as shown, it is well known that the inherent distributed capacitance across one half of the winding is different from that across the other. This inequality of the inherent capacitances tends to create rather severe transient oscillations during and immediately following the retrace interval of each scanning cycle, and such oscillations undesirably create a pattern of vertical spaced bars at the left-hand side of the reproduced image. It is the purpose of the present invention to avoid this effect of the unequal distributed capacitances appearing across the two halves of the scanning winding 18. This is accomplished in accordance with the present invention by connecting the center tap of the winding 18 to the center tap 26 of the choke coil 27 so that the voltages from the center tap to each terminal of the winding 18 must be identical at every instant with the voltages appearing between the center tap 26 and each terminal of the choke coil 27 which is directly across the output circuit of the amplifier tube 19 and is not subject to unequal distributed capacitances across its two halves. By thus "driving" the center tap of the winding 18 from the center-tapped choke coil 27, the unequal inherent capacitances across the two halves of the scanning winding 18 are no longer able to modify or affect the voltages applied to the two halves of the scanning winding. While the center tap of the scanning winding 18 could be directly connected by the conductor 24 to the center tap 26 of the choke coil 27, insofar as the operation last described is concerned, the resistor 25 prevents the connection last mentioned from causing the centering current supplied from the voltage divider 28 from flowing through only one half of the scanning winding 18. That is, the resistor 25 is selected to have a resistance of approximately 1,000 ohms, or roughly ten times the combined ohmic resistance of the choke coil 27 and scanning winding 18, so that the centering current flows through both halves of the scanning winding 18 in series and little of the centering current flows through the resistor 25. By the same token, the resistor 25 has a sufficiently small value with relation to the impedance of the scanning winding 18 at the frequency of the scanning signal as to be negligible insofar as the scanning operation is concerned and particularly insofar as the reduction of the undesirable effect of the unequal distributed capacitances on the two halves of the scanning winding 18 is concerned.

Fig. 2 is a circuit diagram representing a portion of the scanning system of Fig. 1, elements of Fig. 2 corresponding to similar elements of Fig. 1 being designated by similar reference numerals, except that the scanning system of Fig. 2 utilizes a conventional horizontal output transformer 33 having a primary winding 34 included in the output circuit of the amplifier 19 and having a secondary winding 35 coupled to the scanning winding 18. Further by way of modification, the center tap 36 of the secondary winding 35 is coupled through a condenser 37 to the center tap of the winding 18. Centering current is supplied from the voltage divider 28 which has a fixed center tap 32 coupled to one end of the scanning winding 18 and has its movable contact 30 coupled to one end of the secondary winding 35. The operation of this modified form of the invention is essentially similar to that described in connection with Fig. 1, the condenser 34 being used tightly to couple the center tap of the scanning winding 18 to the center tap 36 of the secondary winding 35 of the horizontal output transformer 33 for currents of scanning frequency. This reduces the undesirable effect on the operation of the scanning system of the unequal inherent capacitances appearing across the two halves of the scanning winding 18. At the same time, the condenser 37 insures that centering current supplied from the potential divider 28 flows through the two halves of the winding 18 in series. The use of a coupling condenser 37 requires that the secondary transformer winding 35 and the scanning winding 18 be quite carefully center-tapped electrically, as is also the case where the center taps of the windings 18 and 35 are directly connected by a conductor. With either the use of the coupling condenser 37 or a direct connection between the center taps of the windings 18 and 35, an electrical unbalance of the center taps of approximately 10% or less can be tolerated. Larger percentages of unbalance than this are satisfactory when the resistor 25 of the Fig. 1 arrangement is used.

Figure 3:
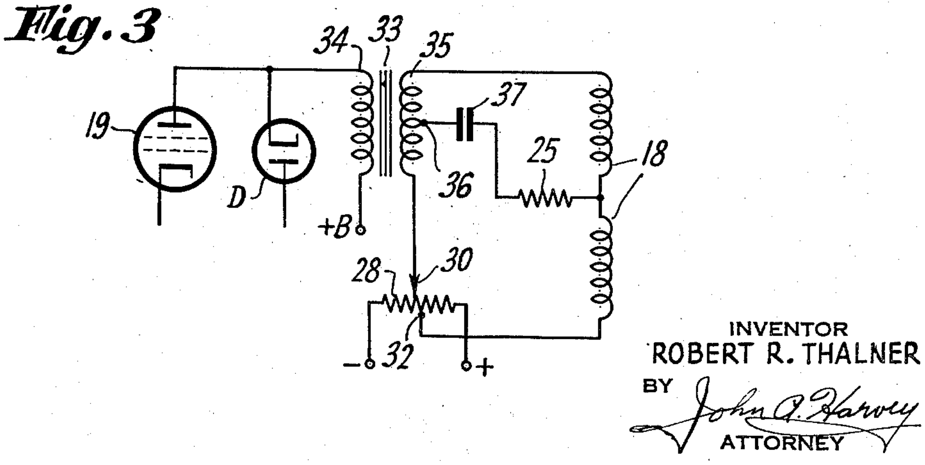

Fig. 3 is a circuit diagram of a portion of the scanning system as in Fig. 2 except that the condenser 37 and the resistor 25 are both used between the center tap 36 of the secondary winding 35 and the center tap of the scanning winding 18. The condenser 37 isolates the center taps of the windings 18 and 35 insofar as centering current is concerned, and this permits the resistor 25 to have a smaller value than in an arrangement of the Fig. 1 type thus more tightly to couple the center taps of the windings 18 and 35 insofar as currents of scanning frequency are concerned. The operation of the Fig. 3 arrangement is otherwise essentially similar to that hereinbefore described.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A magnetic scanning system for a cathode-ray tube comprising, a center-tapped scanning winding for said tube to deflect the cathode-ray beam thereof in one direction, said winding having similar physical winding structures on each side of said center tap but undesirably having unequal inherent distributed capacitances across the two halves thereof, a source of scanning signals for effecting energization of said winding with currents of scanning waveform, and an impedance coupling said source and said winding and including a winding having a center tap coupled through a resistor to the center tap of said scanning winding to reduce the undesirable effect of said unequal distributed capacitances on the scanning action effected by said system.

2. A magnetic scanning system for a cathode-ray tube comprising, a center-tapped scanning winding for said tube to deflect the cathode-ray beam thereof in one direction, said winding having similar physical winding structures on each side of said center tap but undesirably having unequal inherent distributed capacitances across the two halves thereof, a source of scanning signals for effecting energization of said winding with currents of scanning waveform, and an impedance coupling said source and said winding and including a winding coupled through a coupling condenser and resistor in series to the center tap of said scanning winding to reduce the undesirable effect of said unequal distributed capacitances on the scanning action effected by said system.

3. A magnetic scanning system for a cathode-ray tube comprising, a center-tapped scanning winding for said tube to deflect the cathode-ray beam thereof in one direction, said winding having similar physical winding structures on each side of said center tap but undesirably having unequal inherent distributed capacitances across the two halves thereof, a source of scanning signals for effecting energization of said winding with currents of scanning waveform, a transformer having a primary winding in the output circuit of said source and a secondary winding coupled across said scanning winding, said secondary winding having a center tap coupled through a resistor to the center tap of said scanning winding to reduce the undesirable effect of said unequal distributed capacitances on the scanning action effected by said system.

4. A magnetic scanning system for a cathode-ray tube comprising, a center-tapped scanning winding for said tube to deflect the cathode-ray beam thereof in one direction, said winding having similar physical winding structures on each side of said center tap but undesirably having unequal inherent distributed capacitances across the two halves thereof, a source of scanning signals for effecting energization of said winding with currents of scanning waveform, a transformer coupled to said source and including a winding section coupled across said scanning winding, said winding section having a center tap coupled through a resistor to the center tap of said scanning winding to reduce the undesirable effect of said unequal distributed capacitances on the scanning action effected by said system.

5. A magnetic scanning system for a cathode-ray tube comprising, a center-tapped scanning winding for said tube to deflect the cathode-ray beam thereof in one direction, said winding having similar physical winding structures on each side of said center tap but undesirably having unequal inherent distributed capacitances across the two halves thereof, a source of scanning signals coupled through a condenser to said scanning winding for effecting energization of said winding with currents of scanning waveform, an inductor included in the output system of said source for supplying uni-directional energy thereto, and an inductor inductively coupled to said last-mentioned inductor and effectively connected in shunt to said scanning winding to supply a uni-directional centering current thereto, said second inductor having a center tap coupled through a resistor to the center tap of said scanning winding to reduce the undesirable effect of said unequal distributed capacitances on the scanning action effected by said system.

ROBERT R. THALNER.

REFERENCES CITED

The following references are of record in the file of this patent:

UNITED STATES PATENTS

| Number | Name | Date |
|---|---|---|
| 2,260,546 | Tingley | Oct. 28, 1941 |
| 2,393,601 | Baldwin, Jr. | Jan. 29, 1946 |
| 2,396,476 | Schade | Mar. 12, 1946 |
| 2,451,641 | Torsch | Oct. 19, 1948 |
| 2,489,374 | Haantjes et al. | Nov. 29, 1949 |
| 2,492,090 | Bass | Dec. 20, 1949 |
| 2,505,011 | Smyth | Apr. 25, 1950 |
| 2,543,304 | Schwarz | Feb. 27, 1951 |
| 2,555,829 | Barco | June 5, 1951 |
| 2,559,512 | Morgan | July 3, 1951 |